July 10, 1962    H. CHARLES    3,043,669
CHEMICAL TESTING MEANS
Filed Sept. 21, 1960

INVENTOR.
Harold Charles
BY
ATTORNEY

United States Patent Office 3,043,669
Patented July 10, 1962

3,043,669
CHEMICAL TESTING MEANS
Harold Charles, 48—03 Kissena Blvd., Flushing, N.Y.
Filed Sept. 21, 1960, Ser. No. 57,522
14 Claims. (Cl. 23—253)

This invention relates to chemical testing means and more particularly, concerns chemical reagent testing means of the indicator type.

Testing papers of the litmus type and the like, commonly used in organic and inorganic chemical analysis and comprising the overall impregnated papers or the spot impregnated papers, have certain inherent defects.

Thus, the known test papers are expensive because the paper base must be of the highest quality and specially treated to insure absolute neutrality. Furthermore, such papers, if not protected from the effects of light and moisture, will deteriorate rapidly and soon become unreliable for test purposes.

Accordingly, one object of this invention is to provide an improved chemical testing means of the indicator type which is inexpensive and lends itself to high resistance to deterioration.

Also, conventional paper test indicators, as used in practice, allows for the formation of rings due to capillary action, producing two or more colorations. The inner and outer color zones of the rings may vary in intensity, leaving the analyst in doubt as to whether the indicating reaction has actually taken place or not.

Accordingly, another object of this invention is to provide an improved chemical reagent indicator wherein color changes are uniform and devoid of ring effects, and such color changes are of increased intensity as compared to that attained with conventional test papers.

Still another object of this invention is to provide a multiple chemical testing means of the indicator type whereby a plurality of different analyses may be made with the application thereto of a single unknown.

Yet another object of this invention is to provide an improved chemical testing means wherein the indicator is in the form of short threadlike or tubular elements, which elements may be secured to a suitable base by adhesive elements to provide a testing means in the form of a napped device.

Other objects of this invention will in part be obvious and in part hereinafter pointed out.

In the drawing FIG. 1 is a side elevational view of a chemical testing means embodying the invention;

Essentially, chemical testing means embodying the instant invention comprises preparing the dye or other chemical forming the indicating means, in fiberlike or tubular form. Thus, neutral fibers such as cotton, rayon, glass wool or any of the synthetic fibers including nylon or the like, are saturated with the selected dye indicator such as Congo Red, Methyl Violet, Alizarin Blue, as well as phenolphthalein, or any desired reagent. The impregnated fibers are dried and reduced in length by chopping, to the order of about 1/32". Alternatively, fiber can be cut to proper short lengths, and then impregnated with the appropriate reagents.

Figure 1:
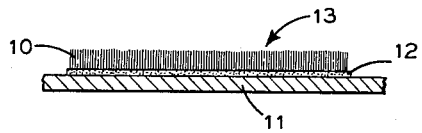
Figure 2:
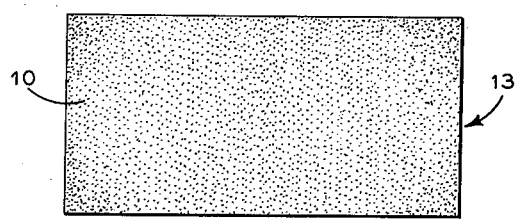
FIG. 2 is a plan view thereof.

As shown in FIGS. 1 and 2, the resultant short fibers 10 are adhesively secured to a base 11 by an adhesive layer 12, to provide a soft velvety nap. The indicator device 13 thus produced, may be also made by any of the well known flocking procedures including electrostatic fiber handling.

Alternatively, the dye or other chemical indicator reagent may be thickened as with starch, methyl cellulose or the like to form a plastic mass which may be extruded through a spinneret to form the desired threadlike or tubular elements of a selected diameter, which may be of the order of about .005". The threadlike elements may be then chopped to suitable length and used to form the napped material, as described above.

Base 11 may be paper, plastic, metal, glass or the like. The paper may be of ordinary quality. Thin film plastics such as polyethylene may be used as a base 11, thereby allowing the finished indicator to be spooled with high resistance to water absorption and deterioration in storage. The backing of paper or plastic may be preprinted to supply color standards, instructions, etc.

If desired, base 11 may be of a metal foil such as aluminum, copper or magnesium, whereby the foil backing may participate in the reaction when the test indicator is in use. Thus, the metal of the foil itself may act as a catalyst or as a reactant in a given reaction.

Figure 3:
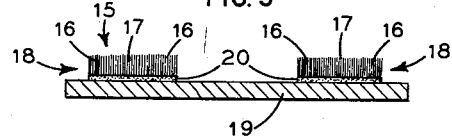
FIG. 3 is a side elevational view of a modified form of the invention.

As shown in FIG. 3, the fiberlike elements 15 may be constituted of several elements 16, 17, wherein elements 16 are made up of one specific chemical indicator while elements 17 are made up of an indicator different from that of element 16. Preferably, the fiberlike elements 16, 17 are prepared separately by impregnating neutral fibers or extrusion, as previously described and then blended in selected portions.

The blended fiberlike elements 16, 17 are then applied as spot formations 18 on backing 19 by way of spot applications of adhesive 20. Thus, when a given unknown material being tested, is applied to the spot formation 18, several tests may be performed simultaneously, each of the fiberlike elements 16, 17 reacting to give their respective indications. Alternatively, the tests may be made serially, going from one spot to another.

It has been found, that with the indicators in fiberlike form, the intensity of the resultant reaction is substantially increased thereby enabling the use of otherwise "faint" indicators. Furthermore, with the uniformity of distribution of the indicator, whether as an impregnant of the fiberlike elements, or in extruded form, no separation or ring effects take place during testing, thereby insuring accuracy in evaluating test results.

It will be apparent that in accordance with the invention, two or more separate reagents capable of reacting in the presence of water, solvent or a further reactant, may be kept in closely adjacent non-reactive form until such time as it is desired that the reaction take place.

Thus, ferrous ammonium sulfate and potassium ferricyanide may be separately prepared in fiber form, as previously described. The two forms of dried fibers are then mixed and applied to a suitable base, as above described. The thus prepared test element remains unchanged indefinitely, but when water is applied to the mixed, adjacent fibers the reagents will react to produce the known blue color of this reaction.

Furthermore, the ultimate reaction may be controlled to a certain extent by proportioning of the reactant fibers; by the disposition of the fibers on the base and the concentration of fibers in a given area on the base.

Figure 4:
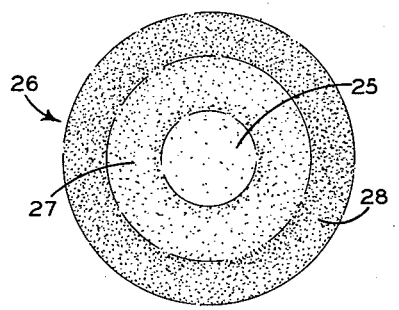
FIG. 4 is a plan view of testing means showing another form of the invention.

As shown in FIG. 4, a mixture of equal parts of ferrous ammonium sulfate fibers and potassium ferricyanide fibers are disposed in a central zone 25 of a test patch 26; the zone 25 being surrounded by a ring 27 of neutral, untreated fibers, which in turn is surrounded by a ring 28 of Congo Red fibers.

Thus, a given test material in liquid form may be applied to central zone 25 to give one reaction perceptible in said zone; the material moving radially outward through ring 27 to ring 28 to cause a second perceptible reaction in ring 28. It is understood that the test material may be initially applied to outer ring 28 for inward movement.

Thus, two or more tests or reactions may be conducted in a serial manner.

As various changes might be made in the embodiments herein described, it is understood that all matter herein described is illustrative and not limiting except as set forth in the appended claims.

What is claimed is:

1. Chemical testing means for detecting the presence of a given constituent in a fluid comprising a base and a fibrous nap adhesively bonded to said base, said nap comprising short fibrous elements including a chemical reagent indicator which will change color upon contact with fluid containing said given constituent.

2. Chemical testing means as in claim 1 wherein said fibrous elements are impregnated with a liquid solution of said indicator.

3. Chemical testing means as in claim 1 wherein said fibrous elements comprise an extruded mass of said indicator.

4. For use in preparing chemical testing means, a body of individual, separate, short fiberlike elements, each element comprising a chemical reagent indicator which will change color upon contact with a fluid containing a given constituent reactive with said chemical reagent indicator, to thereby establish the presence of said given constituent in said fluid.

5. Means for analysing a fluid to establish the presence therein of a given constituent comprising a body of individual, short cotton fibers, each fiber to be wet by said fluid being impregnated with a liquid chemical reagent indicator which will change color in response to the presence of said given constituent in said fluid.

6. Chemical testing means for contact with a fluid comprising a base and a fibrous nap adhesively bonded to said base, said nap comprising a first group of short fibrous elements including one chemical reagent indicator which will change color upon contact with said fluid in response to the presence of one constituent in said fluid and a second group of short fibrous elements including a second chemical reagent indicator different from said one chemical reagent indicator and which will change color in response to the presence of another constituent in said fluid.

7. Chemical testing means for contact with a fluid to establish the presence of a given constituent thereof comprising a group of short fiberlike elements, each fiberlike element including a chemical reagent indicator uniformly distributed throughout the length of said fiberlike element which will change color in response to the presence of said given constituent in the fluid.

8. Chemical testing means for contact with a fluid to establish the presence of several different constituents thereof comprising short fibrous elements including chemical reagents and means for securing said fibrous elements to a base, said fibrous elements being distributed in adjacent zones, the fibrous elements in one zone including a chemical reagent which will change color in response to the presence of one constituent in said fluid, and the fibrous elements of another zone including a second chemical reagent which will change color in response to the presence of another constituent in said fluid.

9. Chemical testing means for contact with a fluid to establish the presence of a given constituent thereof comprising a base and a mass of individual fiberlike elements secured to said base, each fiberlike element including a chemical reagent indicator.

10. Chemical testing means as in claim 9 wherein said base is paper.

11. Chemical testing means as in claim 9 wherein said base is polyethylene.

12. Chemical testing means as in claim 9 wherein said base is a metal foil.

13. Chemical testing means as in claim 9 wherein said fiberlike elements are neutral and said indicator is impregnated into said fiberlike elements.

14. Chemical testing means comprising a patch of mixed, dry fibrous elements, a base and means for securing said fibrous elements to said base in upstanding nap form, some of said fibrous elements including one reactant of a given chemical reaction, other of said fibrous elements including another reactant of said given chemical reaction, said patch being adapted to be treated with a liquid material operative to cause said reactants to react in accordance with said chemical reaction and to change the original color of said fibrous elements to another color indicative of said given chemical reaction.

References Cited in the file of this patent
UNITED STATES PATENTS 2,129,754   Yagoda _____ Sept. 13, 1938